United States Patent Office 3,155,667
Patented Nov. 3, 1964

3,155,667
PROCESS FOR THE PREPARATION OF 9-HYDROXYERGOLINES AND PRODUCTS OBTAINED
Bruno Camerino, Luciano Caglioti, and Gianfranco Cainelli, Milan, Italy, assignors to Società Farmaceutici Italia, Milan, Italy, a corporation of Italy
No Drawing. Filed July 23, 1962, Ser. No. 211,832
Claims priority, application Italy July 27, 1961
6 Claims. (Cl. 260—285.5)

Our invention relates to a process of preparing a 9-hydroxy-6-methyl-ergoline and acyl derivatives thereof and to the new products obtained thereby, which are therapeutically useful for their analeptic power.

Our invention has as an object a process of preparing a 9-hydroxy-6-methyl-ergoline or an acyl derivative thereof by reacting the corresponding 6-methyl-9-ergolene derivative, dissolved in an inert organic solvent, with diborane under substantially anhydrous and oxygen-free conditions so selected that after further reaction with hydrogen peroxide in an alkaline medium a 9-hydroxy-6-methyl-ergoline is produced, the 9-hydroxy group of which may be acylated.

As a further object, is the obtainment of therapeutically useful products.

Preferred organic solvents which are inert under the reaction conditons are tetrahydrofuran, ethyl ether and diethylene-glycol dimethylether. An atmosphere of nitrogen under atmospheric pressure is generally used. The hydroboration reaction is usually carried out at between 0° and 100° C. and preferably at room temperature. The further reaction with hydrogen peroxide is usually at between 0° and 80° C., but preferably at room temperature.

The hydroboration can be carried out either by bubbling the gaseous diborane into the solution of the 6-methyl-9-ergolene derivative, or by adding a diborane solution in an organic solvent, or by adding the diborane as a complex, or by carrying out the reaction in situ, for example by adding lithium aluminum hydride and boron trifluoride (Ann. Reports Chem. Soc., 1959, page 198), or by carrying out the hydroboration with bis-3-methyl-2-butyl-borane or analogues (J. Amer. Chem. Soc., 1961, 83, page 1241). The treatment with diborane, besides acting on 9,10-double bond of the ergoline nucleus, simultaneously reduces free or esterified carboxyl groups of free or substituted carboxyamido groups, of keto groups, of nitro groups and other reducible groups which may be present in the starting material. For instance, if in the 8-position of the starting 6-methyl-9-ergolene derivative a free or esterified carboxyl group is present, this is reduced to an alcohol group.

The 9-hydroxy-6-methyl-ergolene obtained is separated in known manner, as such, or as an acyl derivative by acylation and further purification, either by crystallization or by chromatography on absorbent substances, such as alumina or Florisil (an activated magnesium silicate), and finally by elution with a polar organic solvent.

The acylation may be with the anhydride or chloride of an organic acid, such as acetic acid, propionic acid, valeric acid, butyric acid, benzoic acid or other acids in the optional presence of tertiary amines such as pyridine, diethylaniline or triethylamine. The product may be recovered and purified according to the well known procedures. The reaction with the acylating agent causes the acylation of the secondary 9-hydroxy-group and of any primary or secondary alcohol or amino groups present in the molecule. Acylation of 9-hydroxy-group occurs only after a prolonged heating, generally after 3 to 6 hours.

The new compounds of the invention, 9-hydroxy-6-methyl ergolines which can also be called 9-hydroxy-dihydrolysergols, and their acyl derivatives have the following formula:

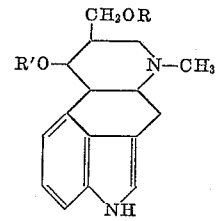

wherein when R is hydrogen, R' is hydrogen and when R is an acyl group, R' may be hydrogen or an acyl group. This includes 9-hydroxy-dihydro-lysergol itself and the corresponding di- and mono-acetates, propionates, valerates, butyrates and benzoates which may be obtained by the process of the invention from lysergic acid and its esters, such as the methyl- or ethyl-ester.

By acylation, in the warm, for 0.5–1 hour, the 8-monoacyl derivatives are prevalently obtained, while by prolonged heating for some hours, the 8,9-diacyl derivatives are produced.

The new compounds of the invention show a high analeptic, cardiazol-like activity. They display a good action on an altered circulation rate, excite the central nervous system, enhance respiration by increasing both the tidal volume and the respiratory rate. They also display a useful action in those cases where hypnotics and narcotics have depressed the respiration. They can also be considered as antidotes of morphine. The most important clinical uses are in blood circulation diseases; shock; narcosis accidents; poisoning by gas, narcotics, barbiturates, or alcohol; asphyxia; heart diseases; bronchitis and broncopneumonia.

The compounds of our invention may be administered in several therapeutic forms, by oral and parenteral administration alone or in admixture with a pharmacologically acceptable liquid or solid vehicle. Solid compositions may be in the form of tablets, pills, powders or capsules, while liquid compositions may be solutions, emulsions or suspensions, etc. The posology in the human field, which may range from 0.01 to 0.1 g. per day, depends on the particular clinic indication and pharmaceutical form. Such quantities may be prepared in dosage unit form.

The following examples illustrate, but are not intended to limit, the invention.

EXAMPLE 1

9-Hydroxy-Dihydro-Lysergol

A solution of 1 g. of monohydrated lysergic acid in 40 cc. of tetrahydrofuran was reacted, at room temperature and under anhydrous nitrogen, with an excess of diborane for an hour and was then kept overnight under stirring. The reaction mixture was then poured into 50 cc. of 5% methanolic potassium hydroxide and, when the gas development ceased, 5 cc. of 35% hydrogen peroxide were added. After about 15 minutes the resulting mixture was diluted with water and the whole solution was extracted with ethyl ether.

The ether extracts were washed with ferrous sulphate solution and with water to neutrality, dried over anhydrous sodium sulphate and then the solvent was distilled off. The residue (903 mg.) was dissolved in 40 cc. of methanol and refluxed for three hours. About 10 cc. of water were then added in portions, keeping the mixture always at the boiling point. After cooling, the mixture was concentrated in vacuo to about one-third of its volume and was allowed to separate for a few hours. The resulting precipitate was filtered, washed with a small amount of methanol and dried (550 mg.).

The product, checked by thin-layer chromatography, showed that it is a single compound which melts at 275–280° C. (with decomposition).

$[\alpha]_D^{22} = -25°$ (c.=1.4 in 0.1 N HCl); $\lambda_{max}$ at 284 m$\mu$,

=0.239 (in 0.1 N HCl).

This product is 9-hydroxy-dihydro-lysergol $$(C_{16}H_{20}O_2N_2)$$

The same results were obtained by employing the ethyl- or methyl-ester of lysergic acid instead of lysergic acid.

EXAMPLE 2

*8,9-Diacetate of 9-Hydroxy-Dihydro-Lysergol*

500 mg. of 9-hydroxy-dihydro-lysergol, obtained as described in Example 1, were reacted with 15 cc. of acetic anhydride and 15 cc. of pyridine and refluxed under nitrogen for 3–4 hours. After cooling and elimination of the solvents in vacuo, 600 mg. of a viscous dark brown product was obtained. The crude product was then chromatographed on a neutral alumina column. By elution with benzene-ethyl-ether in ratios 9:1 and 3:1, 150–190 mg. of a colorless crystalline product was obtained, which on recrystallization from acetone-hexane shows a constant melting point at 160–161° C.:

$[\alpha]_D^{20} = -93°$ (c.=1.08 in pyridine).

This product was the 8,9-diacetate ($C_{20}H_{24}O_4N_2$).

In the same way, by employing the anhydrides or chlorides of propionic, butyric, valeric, benzoic or other acids, the corresponding 8,9-diacyl-derivatives may be obtained.

EXAMPLE 3

*8-Acetate of 9-Hydroxy-Dihydro-Lysergol*

800 mg. of 9-hydroxy-dihydro-lysergol, obtained as described in Example 1, were reacted with 15 cc. of acetic anhydride and 15 cc. of pyridine and refluxed under nitrogen for 30 minutes to 1 hour. After cooling and the elimination of the solvents in vacuo, 900–950 mg. of a colored crude product were obtained, which was further purified by chromatography on alumina. By elution with benzene-ether 3:1 and benzene-ether 1:1, 150 mg. of a crystalline product were obtained, which on recrystallization from acetone-heptane, shows a constant melting point at 204° C.:

$[\alpha]_D^{23°} = -67°$ (c.=0.662 in pyridine).

This product is the 8-monoacetate ($C_{18}H_{22}O_3N_2$).

Further acetylation converted the monoacetate into the diacetate, melting at 160–161° C., which is described in Example 2.

In the same way, by employing the anhydride or chloride of propionic, butyric, valeric, benzoic or other acid, the corresponding 8-monoacyl-derivatives may be obtained.

Pharmacology

The activity of the products of the invention has been tested on rabbits having their respiration depressed by morphine (rabbit under urethane anesthesia and treated with morphine).

It has been found that 8, 9-diacetate-dihydrolysergol at a dose of 100$\mu$ per kg. increases the respiratory rate considerably (even more than 100%). The same effect obtained with coramine requires a dose of 5–20 mg. per kg.

We claim:
1. 9-hydroxy-dihydro-lysergol.
2. 8,9-diacetate of 9-hydroxy-dihydro-lysergol.
3. 8-acetate of 9-hydroxy-dihydro-lysergol.
4. A process of preparing 9-hydroxy-dihydro-lysergol, which consists essentially of the steps of
    (a) reacting a compound selected from the group consisting of lysergic acid and a lower alkyl ester of lysergic acid, dissolved in a solvent selected from the group consisting of tetrahydrofuran, ethyl ether and diethylene-glycol dimethyl ether, with diborane under substantially anhydrous and oxygen-free conditions and
    (b) reacting the product of step (a) with hydrogen peroxide in an alkaline medium.
5. A process for the preparation of 9-hydroxy-dihydro-lysergol, which consists essentially of the steps of
    (a) reacting a compound selected from the group consisting of lysergic acid and a lower alkyl ester of lysergic acid, dissolved in a solvent selected from the group consisting of tetrahydrofuran, ethyl ether and diethylene-glycol dimethyl ether, with diborane under nitrogen, at atmospheric pressure and at a temperature from 0° to 100° C. to produce a reaction mixture, and
    (b) reacting said reaction mixture with hydrogen peroxide in alkaline medium at a temperature from 0° to 80° C., to produce 9-hydroxy-dihydro-lysergol.
6. A process of preparing a compound of the formula:

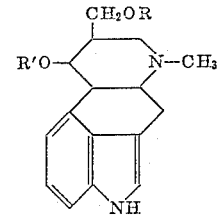

wherein
R is Ac;
R' is selected from the group consisting of hydrogen and Ac;
Ac is an acyl radical of a member selected from the group consisting of an aliphatic and aromatic carboxylic acid having from 1 to 9 carbon atoms;
which consists essentially of the steps of:
    (a) reacting a compound selected from the group consisting of lysergic acid and a lower alkyl ester of lysergic acid, dissolved in a solvent selected from the group consisting of tetrahydrofuran, ethyl ether and diethylene-glycol dimethyl ether, with diborane under substantially anhydrous and oxygen-free conditions,
    (b) reacting the product of the first step with hydrogen peroxide in an alkaline medium and
    (c) reacting the resulting 9-hydroxy-dihydro-lysergol with an acylating agent selected from the group consisting of the anhydride and chloride of a carboxylic acid selected from the group consisting of aliphatic and aromatic acids having from 1 to 9 carbon atoms.

References Cited in the file of this patent

Patterson et al.: The Ring Index, p. 610 (1960).
Burger: Medicinal Chemistry, 2nd ed., pp. 585–6 and 622, RS 403 B 8 (1960).